(12) United States Patent
Takahashi et al.

(10) Patent No.: US 12,384,510 B2
(45) Date of Patent: Aug. 12, 2025

(54) AUTOMATIC STEERING DEVICE, AUTOMATIC STEERING SYSTEM, AUTOMATIC STEERING METHOD, AND AUTOMATIC STEERING PROGRAM

(71) Applicant: FURUNO ELECTRIC CO., LTD., Hyogo (JP)

(72) Inventors: Tomoyasu Takahashi, Amagasaki (JP); Naoya Hashimoto, Nishinomiya (JP); Ardhana Wicaksono, Misato (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 286 days.

(21) Appl. No.: 18/184,520

(22) Filed: Mar. 15, 2023

(65) Prior Publication Data
US 2023/0303232 A1    Sep. 28, 2023

(30) Foreign Application Priority Data
Mar. 22, 2022   (JP) ................................. 2022-045591

(51) Int. Cl.
*B63H 25/04* (2006.01)
*B63H 25/06* (2006.01)

(52) U.S. Cl.
CPC ............. *B63H 25/04* (2013.01); *B63H 25/06* (2013.01)

(58) Field of Classification Search
CPC ................................ B63H 25/04; B63H 25/06
USPC .......................................................... 701/21
See application file for complete search history.

(56) References Cited

U.S. PATENT DOCUMENTS

| 4,074,648 A | 2/1978 | Reid et al. |
| 12,065,230 B1 * | 8/2024 | Derginer ................ B63H 20/12 |
| 2019/0324462 A1 * | 10/2019 | Imamura .................. B63J 99/00 |
| 2020/0140052 A1 * | 5/2020 | Derginer ................ B63H 21/21 |

FOREIGN PATENT DOCUMENTS

| CN | 101713998 A | * | 5/2010 |
| CN | 113359446 A | * | 9/2021 |
| CN | 114047743 A | * | 2/2022 |

(Continued)

OTHER PUBLICATIONS

Toshihiko Nakatani et al: "A study onship's autopilot system for a small boat", Control, Automation and Systems (ICCAS), 2011 11th International Conference On, IEEE, Oct. 26, 2011 (Oct. 26, 2011), pp. 1756-1760.

(Continued)

*Primary Examiner* — Krishnan Ramesh
(74) *Attorney, Agent, or Firm* — Studebaker Brackett PLLC

(57) ABSTRACT

To control an automatic steering appropriately regardless of a ship speed, an automatic steering device includes processing circuitry. The processing circuitry acquires motion information including a ship length and a ship speed. The processing circuitry identifies a non-dimensionalizing motion parameter based on the ship length and the motion information. The processing circuitry generates a dimensionalizing motion parameter by dimensionalizing the non-dimensionalizing motion parameter based on the ship speed. The processing circuitry sets a control parameter of the model-based controller based on the dimensionalizing motion parameter.

16 Claims, 9 Drawing Sheets

(56) References Cited

FOREIGN PATENT DOCUMENTS

JP          H0780477 B2    8/1995
JP          4917272 B2     4/2012

OTHER PUBLICATIONS

Dyda A A et al: "An Effective and Simple Adaptive Algorithm for Ship Course Control Systems", 2019 International Multi-Conference on Industrial Engineering and Modern Technologies (FAREASTCON), IEEE, Oct. 1, 2019 (Oct. 1, 2019), pp. 1-6.
Extended European Search Report issued in EP 23158319.6-1205 by the European Patent Office on Jul. 14, 2023, which is related to U.S. Appl. No. 18/184,520.

* cited by examiner

AUTOMATIC STEERING DEVICE, AUTOMATIC STEERING SYSTEM, AUTOMATIC STEERING METHOD, AND AUTOMATIC STEERING PROGRAM

CROSS-REFERENCE TO RELATED APPLICATION(S)

This application claims priority under 35 U.S.C. § 119 to Japanese Patent Application No. 2022-045591, which was filed on Mar. 22, 2022, the entire disclosure of which is hereby incorporated by reference.

BACKGROUND

Technical Field

The present disclosure relates to a technology of an automatic steering in which the steering of a ship is controlled automatically.

When the ship's speed changes, the control performance deteriorates.

Therefore, the purpose of the present disclosure is to appropriately control the automatic steering regardless of the ship's speed.

SUMMARY

The automatic steering device of the present disclosure is equipped with processing circuitry. The processing circuitry acquires motion information including a ship length and a ship speed. The processing circuitry identifies a non-dimensionalizing motion parameter based on the ship length and the motion information. The processing circuitry generates a dimensionalizing motion parameter by dimensionalizing the non-dimensionalizing motion parameter based on the ship speed. The processing circuitry sets a control parameter of the model-based controller based on the dimensionalizing motion parameter. In this configuration, control parameter can be set according to the ship speed. This makes it possible to appropriately control the automatic steering regardless of the ship speed.

In the automatic steering device of the present disclosure, the processing circuitry generates the dimensioned motion parameter based on the ship speed when the ship speed changes by more than a preset threshold value after generating the dimensionalizing motion parameter. The processing circuitry updates the control parameter based on the dimensionalizing motion parameter after the change in the ship speed. In this configuration, the control parameter can be updated at an appropriate frequency.

In the automatic steering device of the present disclosure, the processing circuitry generates the dimensionalizing motion parameter when a predetermined time elapses from the time when the dimensionalizing motion parameter are generated. The processing circuitry updates the control parameter based on the dimensionalizing motion parameter after the predetermined time elapses. In this configuration, the control parameter can be updated at proper timing.

In the automatic steering device of the present disclosure, the processing circuitry acquires a target direction of the ship and a heading of the ship. The processing circuitry switches the control mode of the automatic navigation based on a deviation between the target direction and the heading of the ship. When the control mode is switched, the processing circuitry identifies the non-dimensionalizing motion parameter based on the motion information of the ship acquired in the control mode before the switching. In this configuration, the non-dimensionalizing motion parameter can be properly identified.

In the automatic steering device of the present disclosure, the processing circuitry generates a command rudder angle based on the control parameter set including the target direction. In this configuration, a more appropriate command rudder angle can be generated.

In the automatic steering device of the present disclosure, the processing circuitry sets an unstable loop width of the ship based on a kinetic model of the body of the ship identified by using the motion information of the ship, which includes the command rudder angle, the heading, and a ship position. In this configuration, the unstable loop width that adversely affects the automatic steering can be properly determined.

In the automatic steering device of the present disclosure, the processing circuitry sets the command rudder angle to a value outside a range of the unstable loop width when the command rudder angle generated by the model-based controller is within the range of the unstable loop width. In this configuration, a more appropriate command rudder angle can be output for automatic steering.

In the automatic steering device of the present disclosure, the processing circuitry does not output the command rudder angle generated by the model-based controller or sets it to a predetermined value when the command rudder angle is within a rudder angle deadzone. In this configuration, an appropriate command rudder angle corresponding to a preset predetermined value can be set.

The automatic steering system of this disclosure is provided with an automatic steering device described in any of the above and a rudder that controls a rudder angle based on the command rudder angle estimated by the automatic steering device. In this configuration, since the control parameter are set appropriately as described above, more appropriate automatic steering can be realized.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

Figure 1:
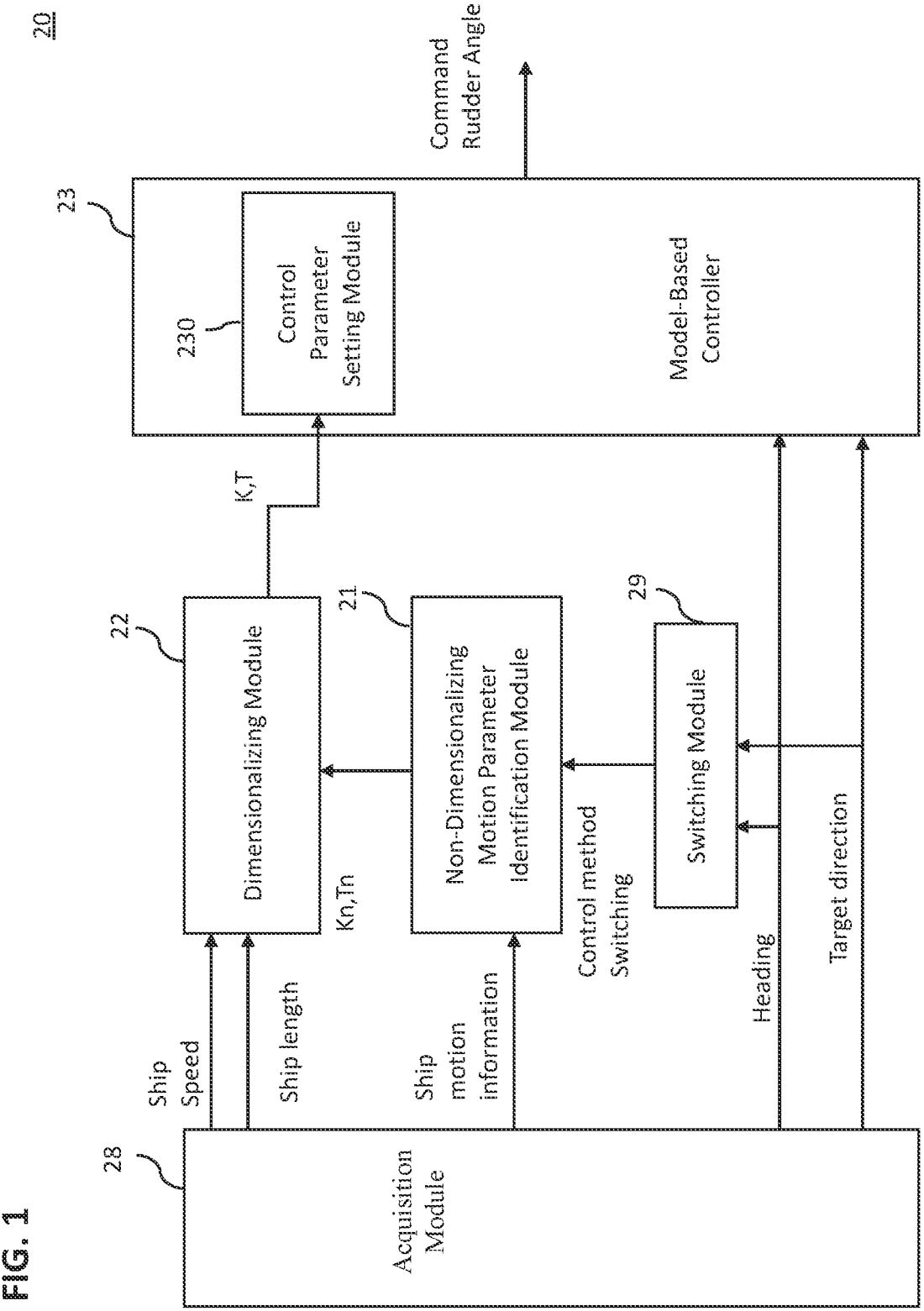
FIG. 1 is a functional block diagram illustrating a configuration of a processor module according to the first embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
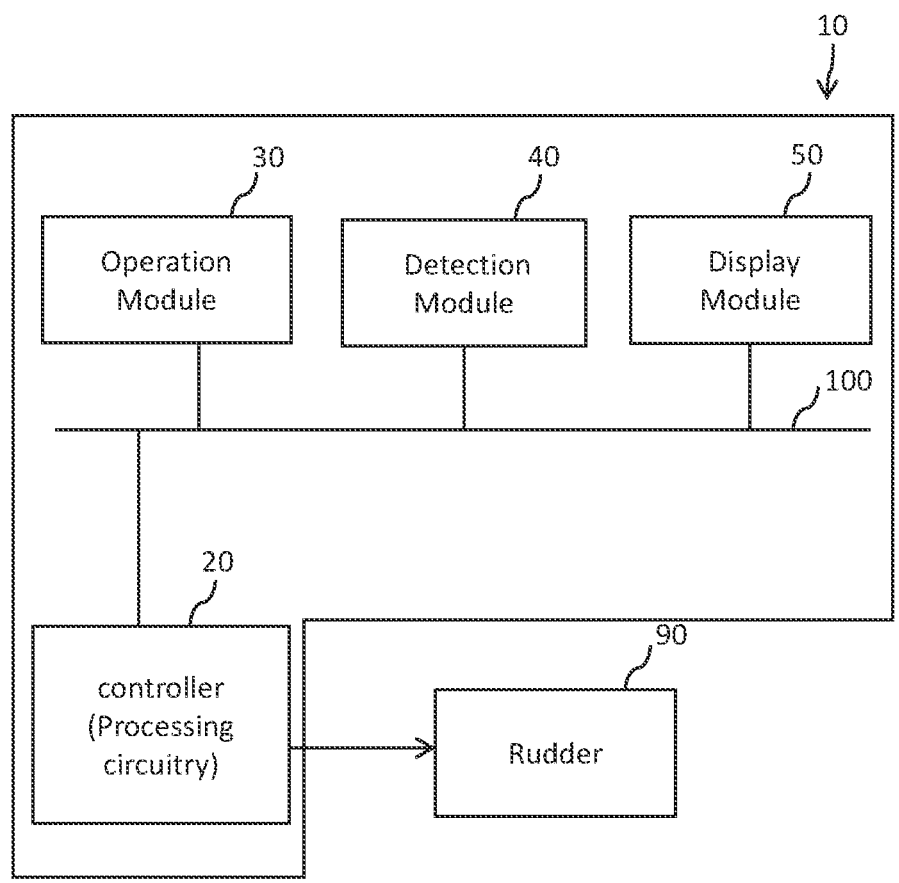
FIG. 2 is a functional block diagram illustrating the configuration of an automatic steering system according to the first embodiment of the present disclosure.

An automatic steering device, an automatic steering system, an automatic steering method and an automatic steering program according to a first embodiment of the present disclosure will be described with reference to the drawings. FIG. 1 is a functional block diagram illustrating a configuration of a processor module according to the first embodiment of the present disclosure. FIG. 2 is a functional block diagram illustrating the configuration of the automatic steering system according to the first embodiment of the present disclosure.

First, the configuration of the automatic steering system 10 will be described using FIG. 2. As shown in FIG. 2, the automatic steering system 10 includes a processor module 20 (or "processing circuitry"), an operation module 30, a detection module 40, and a display module 50. The automatic steering system 10 is installed in a ship of a ship performing, for example, autopilot control (automatic navigation control). The processor module 20 corresponds to the "automatic steering system" of the present disclosure.

The processor module 20 of the automatic steering system 10 is connected to a rudder 90. The rudder 90 is mounted on the ship. The processor module 20 and the rudder 90 are connected, for example, via analog voltage or data communication.

Although not shown, propulsion generating devices such as screw propellers are also mounted on the ship. The processor module 20 also controls the generation of propulsion to the propulsion generating devices, but a detailed explanation is omitted here.

The processor module 20, the operation module 30, the detection module 40 and the display module 50 are connected to each other by, for example, a data communication network 100 for vessels.

The processor module 20 generates a command rudder angle and outputs it to the rudder 90. The rudder 90 receives the command rudder angle and controls the rudder using a turning signal corresponding to the command rudder angle. The specific generation method of the command rudder angle will be described later.

The operation module 30 is realized by, for example, a touch panel, physical buttons or switches. The operation module 30 accepts the operation of settings related to the autopilot control. The operation module 30 also accepts an input of the ship specifications. For example, a target direction is acquired by the operation input from the operation module 30. The operation module 30 also accepts the input of information related to a shape of the ship at the time of navigation, such as a total length or inter-perpendicular length of the ship, and a draft length. In the following, the case where the input of the inter-perpendicular length, which is a kind of a ship length, is accepted is explained. If the total length of the ship is input as the ship length, the total length of the ship can be converted to the inter-perpendicular length and then used for the following control and treatment.

The detection module 40 acquires motion information of the ship. The motion information includes a ship speed, a heading, a turning speed and a ship position. The detection module 40 is realized, for example, by various sensors or those that calculate the motion information using GPS positioning results.

The display module 50 displays, for example, information related to the autopilot control when it is input from the processor module 20. The display module 50 is realized by, for example, a liquid crystal panel. Although the display module 50 can be omitted, it is preferable to have it, and by having the display module 50, the user can easily grasp the autopilot control status, etc.

The processor module 20 is composed of, for example, an arithmetic processing unit such as a CPU and a storage module such as a semiconductor memory. The storage module stores a program to be executed by the processor module 20. In addition, a storage module is utilized when computing the CPU.

As shown in FIG. 1, the processor module 20 includes a non-dimensionalizing motion parameter identification module 21, a dimensionalizing module 22, a model-based controller 23, an acquisition module 28, and a switching module 29.

The acquisition module 28 acquires the motion information including the ship speed of the ship and the ship length. For example, the acquisition module 28 acquires the motion information of the ship from the detection module 40 and acquires the ship length and the target direction input from the operation module 30. When the ship length and the target direction are stored in advance, the acquisition module 28 reads the stored ship length. The acquisition module 28 outputs the motion information and ship length to the non-dimensionalizing motion parameter identification module 21. The acquisition module 28 also outputs the ship speed and ship length to the dimensionalizing module 22. The acquisition module 28 also outputs the heading and the target direction to the switching module 29.

The switching module 29 switches the control mode of the automatic navigation based on the deviation between the target direction and the heading of the ship. When the control mode of the automatic navigation is switched from the turning mode to the needle holding mode, the switching module 29 outputs an identification start trigger of the non-dimensionalizing motion parameters to the non-dimensionalizing motion parameter identification module 21.

Upon receiving the identification start trigger of the non-dimensionalizing motion parameters, the non-dimensionalizing motion parameter identification module 21 identifies the autonomous motion parameters using the ship motion information before switching the mode, that is, during a turning mode.

More specifically, the non-dimensionalizing motion parameter identification module 21 identifies the non-dimensionalizing motion parameters. As the identification method, for example, optimization methods such as least squares, sequential quadratic programming, and CMA-ES are used using the motion information of the ship acquired during the turning motion of the ship.

Figure 3:
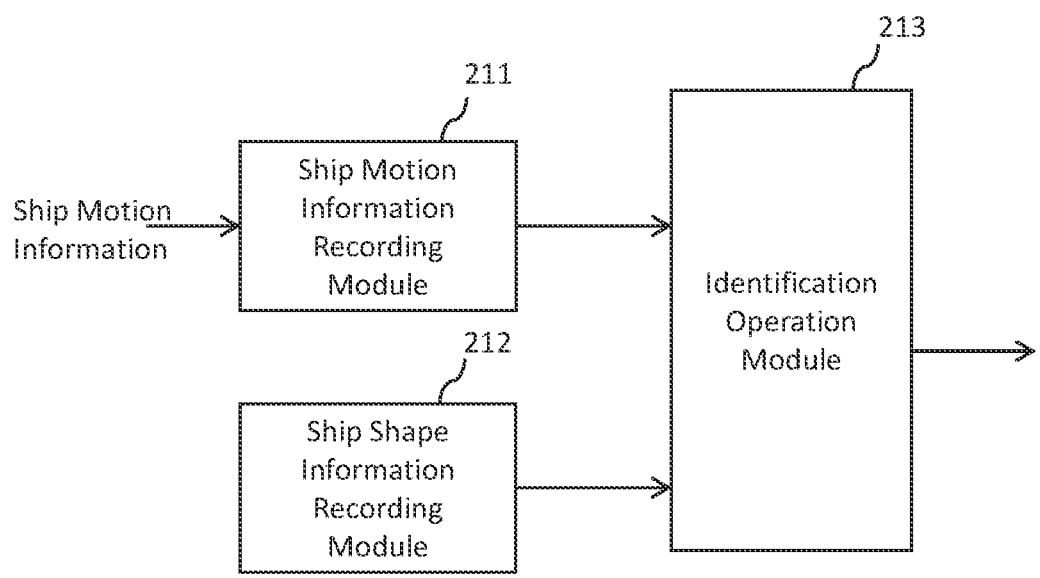
FIG. 3 is a functional block diagram of a non-dimensionalizing motion parameter identification module.

FIG. 3 is a functional block diagram of the non-dimensionalizing motion parameter identification module. More specifically, as shown in FIG. 3, the non-dimensionalizing motion parameter identification module 21 includes a ship motion information recording module 211, a ship shape information recording module 212, and an identification operation module 213.

The ship motion information recording module 211 records ship motion information from the beginning to the end of the turning. For example, a total of 4 types of ship motion information are obtained: the ship speed, the rudder angle, the turning angle speed, and a turning angle acceleration. After the change of direction is completed, the ship motion information recording module 211 outputs the recorded ship motion information to the identification operation module 213.

The ship shape information recording module 212 records ship shape information input when the autopilot is installed on the ship. The ship shape information is, for example, the length between perpendicular lines, which is one of the main ship elements. The ship shape information recording module 212 outputs the ship shape information to the identification operation module 213.

The identification operation module 213 identifies the non-dimensionalizing motion parameters based on the ship motion information from the ship motion information recording module 211 and the ship shape information from the ship shape information recording module 212. Specifically, the identification operation module 213 identifies the non-dimensionalizing motion parameters using, for example, the following model.

Nomoto's first-order model is set as the kinetic model of the body of the ship using the turning speed r (t) and steering angle delta (t) of the ship motion information, and the turning index K and the following index T.

$$K\delta(t) = r(t) + T\frac{dr(t)}{dt} \quad (1)$$

When the equation (1) is modified by using the non-dimensional slewing index Kn and the non-dimensional followability index Tn, where the slewing index K is non-dimensional and the followability index T is non-dimensional, and the ship speed V (t) in the ship motion information and the ship length (length between perpendicular lines) Lpp in the ship shape information, the equation (2) is obtained.

$$K_n \frac{V(t)}{Lpp} \delta(t) = r(t) + T_n \frac{Lpp}{V(t)} \frac{dr(t)}{dt} \quad (2)$$

For this model equation, an identification operation module 213 identifies the non-dimensional swirling index Kn and the non-dimensional following index Tn using the least squares method as an optimization algorithm.

The non-dimensionalizing motion parameter identification module 21 outputs the non-dimensionalizing motion parameter (Turning index Kn, following index Tn) to the dimensionalizing module 22.

The dimensionalizing module 22 dimensionalizes the non-dimensionalizing motion parameter (Turning index Kn, following index Tn) using the ship speed vt and ship length Lpp at the desired dimensionalized timing and sets the dimensionalizing motion parameter (Turning index K, following index T). At this time, the dimensionalizing module 22 sets the dimensionalizing motion parameter using K=(vt/Lpp) Kn T=(Lpp/vt) Tn.

The dimensionalizing module 22 outputs the dimensionalizing motion parameters (Turning index K, following index T) to the model-based controller 23.

The model-based controller 23 includes a control parameter setting module 230. The control parameter setting module 230 sets the control parameters based on the dimensionalizing motion parameters (Turning index K, following index T).

Figure 4A:
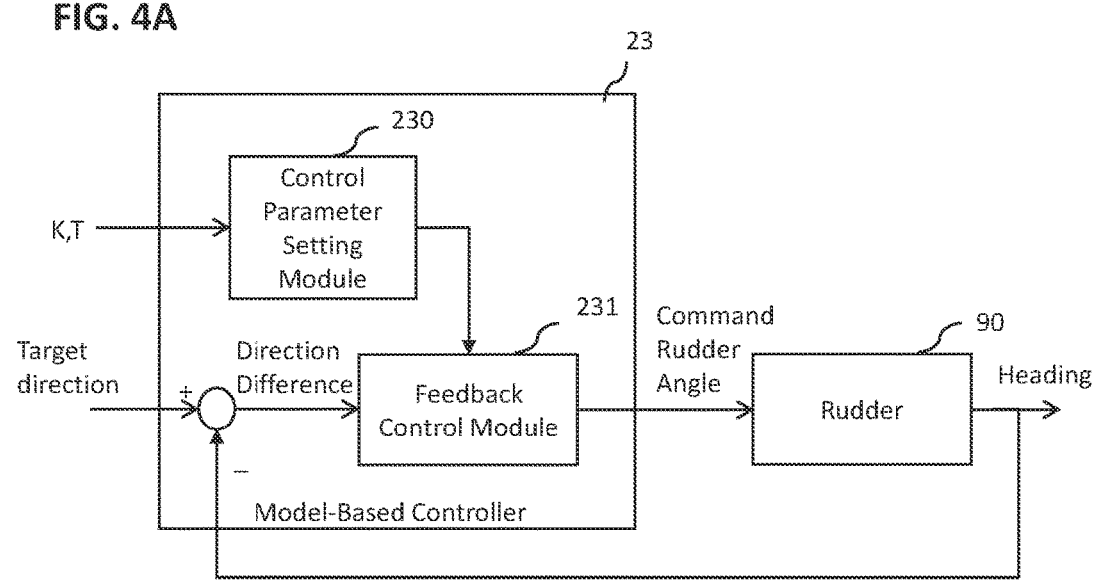
FIG. 4A and FIG. 4B are control block diagrams including a model-based controller of an automated steering system according to the first embodiment of the present disclosure.
Figure 4B:
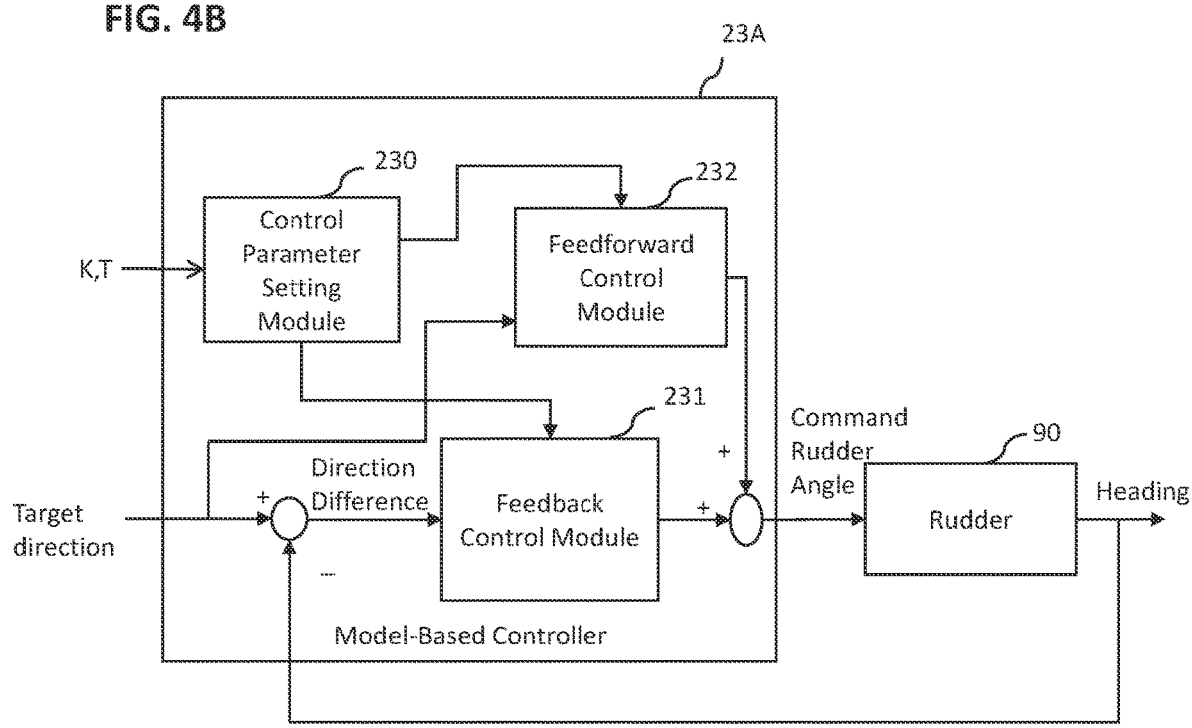

FIGS. 4(A) and 4(B) are control block diagrams including the model-based controller of the automatic steering system according to the first embodiment of the present disclosure. FIG. 4(A) is a control block diagram using only feedback control, and FIG. 4(B) is a control block diagram combining feedback control and feedforward control.

In the configuration of FIG. 4(A), the model-based controller 23 includes a feedback control module 231. The feedback control module 231 is, for example, a controller that performs PID control.

The control parameter setting module 230 sets the control parameters (Kp, Kd, Ki) of the feedback control module 231 based on the dimensionalizing motion parameters (Turning index K, following index T).

The feedback control module 231 generates (estimates) a command rudder angle by feedback control, taking as input the difference in azimuth between a target azimuth and a bow azimuth. The model-based controller 23 outputs the command rudder angle generated by the feedback control module 231 to the rudder 90.

In the configuration of FIG. 4(B), the model-based controller 23A includes a feedback control module 231 and a feedforward control module 232.

The control parameter setting module 230 sets the control parameters (Kp, Kd, Ki) of the feedback control module 231 and the control parameters of the feedforward control module 232 based on the dimensionalizing motion parameters (Turning index K, following index T).

The control parameter of the feedforward control module 232 is the gain v, and the control parameter setting module 230 sets the gain v based on the dimensionalizing motion parameters (Turning index K, following index T).

The feedforward control module 232 generates (estimates) a command rudder angle by feedforward control according to a preset control law (v .DELTAC <SUB> h </SUB>) using the target direction as input. Note that .DELTAC <SUB> h </SUB> is the difference between the current bow direction and a future target direction. In this context, "future" is the time t in the case where the bow direction is expected to match the target direction at a certain future time t.

The model-based controller 23A adds the command rudder angle by feedback control and the command rudder angle by feed-forward control and outputs it as the command rudder angle generated by the model-based controller 23A. That is, the model-based controller 23A corrects the command rudder angle by feed-forward control by the command rudder angle by feedback control and outputs it.

With this configuration and control, the control parameters of the model-based controllers 23 and 23A are properly set according to the ship speed corresponding to the output of the command rudder angle. With this, the processor module 20 can output the appropriate command rudder angle corresponding to the ship speed to the rudder 90. Therefore, the automatic steering system 10 can properly control the automatic steering regardless of the ship speed.

Figure 5:
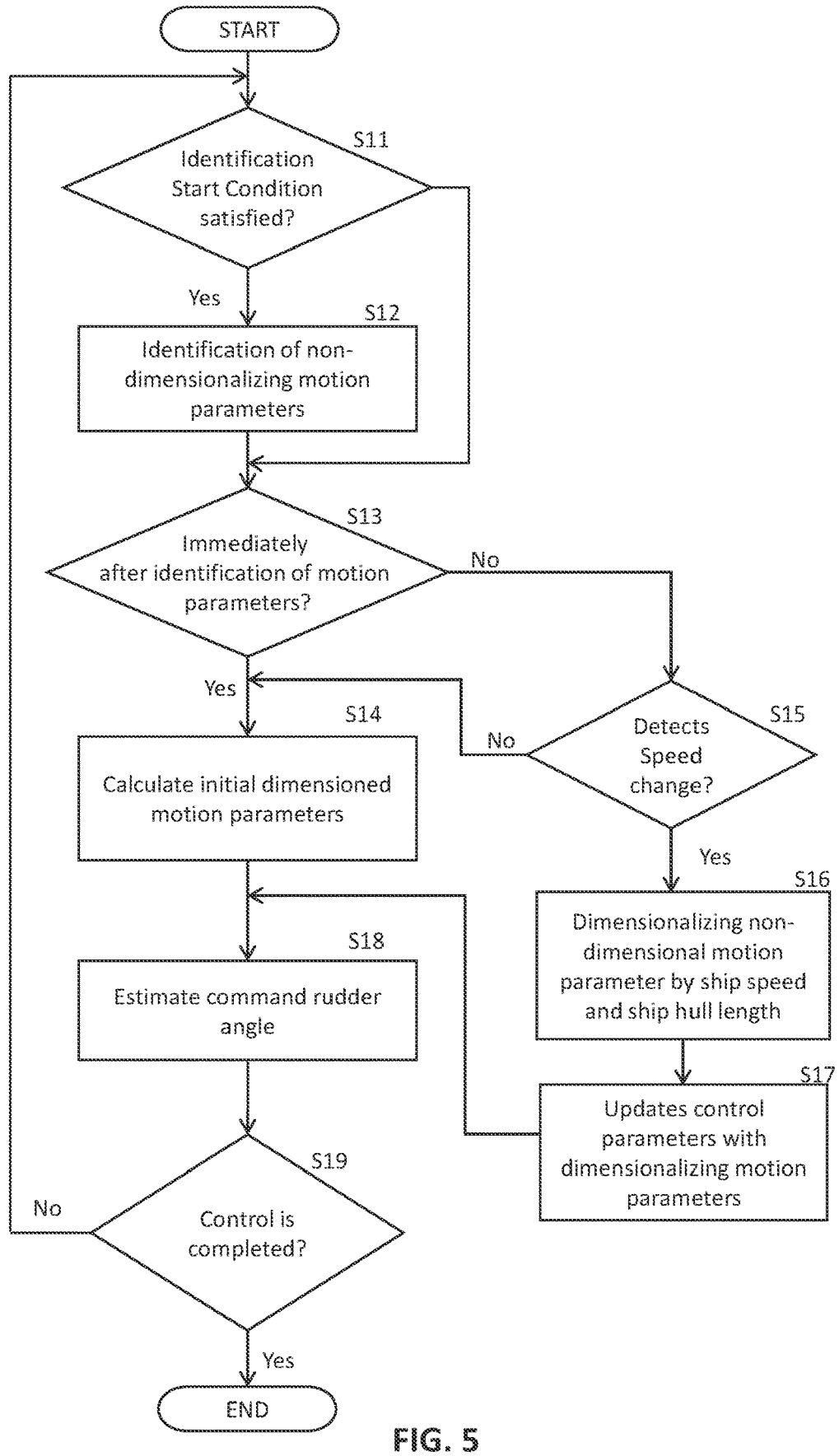
FIG. 5 is a flow chart illustrating a flow of schematic processing of an automated steering method executed by the processor module according to the first embodiment of the present disclosure.

The above processing is realized, for example, by processing of the flowchart shown in FIG. 5. FIG. 5 is a flow chart illustrating the flow of the schematic processing of the automatic steering method executed in the processor module according to the first embodiment of the present disclosure.

When the identification start condition is satisfied (S11: YES), the processor module 20 uses ship motion information and ship shape information and various optimization techniques to identify the non-dimensionalizing motion parameters and generate the non-dimensionalizing motion parameters (Kn, Tn) (S12).

Note that the identification of the non-dimensionalizing motion parameters (Kn, Tn) is performed by using the motion information of the ship during the turning mode in the autopilot control, for example. In this case, the identification start condition is the start timing of the autopilot control and the start timing of the turning mode. Thus, the processor module 20 can properly identify the non-dimensionalizing motion parameters (Kn, Tn).

In the case immediately after the identification of the motion parameters (S13: YES), the processor module 20 calculates the initial dimensionalizing motion parameters (K, T) according to the identified speed of the non-dimensionalizing motion parameters, and sets the control parameters of the model controller with the initial dimensionalizing motion parameters (K, T) (S14). Immediately after the identification means, for example, when the ship speed does not change from the identified speed, the time period when the ship speed hardly changes even if the target ship speed is changed.

When not immediately after the identification of the motion parameter (S13: No), the processor module 20 detects whether there is a speed change from the identified speed. When there is a speed change, the processor module 20 dimensionalizes the non-dimensionalizing motion parameter (Kn, Tn) by ship speed and ship length to generate a dimensionalizing motion parameter (K, T) (S16). Note that when there is a speed change, it means when the speed changes more than a preset threshold value of the speed change. Thus, by setting the detection of the presence of the speed change by the preset threshold value of some magnitude, the computational load of the control parameters can be suppressed. In addition, the change of the control parameters can be suppressed at a frequency that does not act so effectively on the response of the rudder, etc.

The processor module 20 updates the control parameters of the model controller with the dimensionalizing motion parameters (K, T) (S17).

The processor module 20 estimates the command rudder angle using the set control parameters (S18). The processor module 20 repeats the control described above until the control is completed (S19: No).

For example, in the flow of steps S15: YES, S16 and S17, if the ship speed v1 at time t1, the ship speed v2 at time t2 after the prescribed time, and the speed change between the ship speed V2 and the ship speed v1 is equal to or greater than the preset threshold value, the dimensionalizing motion parameter (K (v1), T (v1)) set at the ship speed v1 at time t1 is updated to the dimensionalizing motion parameter (K (v2), T (v2)) set at the ship speed v2 at time t2, and the control parameter is updated with this updated motion parameter (K (v2), T (v2)).

On the other hand, in the flow of steps S15: NO and S14, if the ship speed v1 at time t1, the ship speed v2 at time t2 after the prescribed time, and the speed change between the ship speed V2 and the ship speed v1 is less than the preset threshold value, the dimensionalizing motion parameter (K (v1), T (v1)) set at the ship speed v1 at time t1 and the corresponding control parameter are used.

When the control is finished (S19: YES), the processor module 20 finishes setting, updating, setting and updating the above-mentioned motion parameters. The timing of finishing the control is, for example, when the autopilot control is finished, that is, when the automatic steering is switched to the manual steering.

The processor module 20 may store the non-dimensionalizing motion parameters. In this case, the next setting of the control parameters may be performed by the processor module 20 using the stored non-dimensionalizing motion parameters, and identification of the first non-dimensionalizing motion parameters can be omitted.

Figure 6:
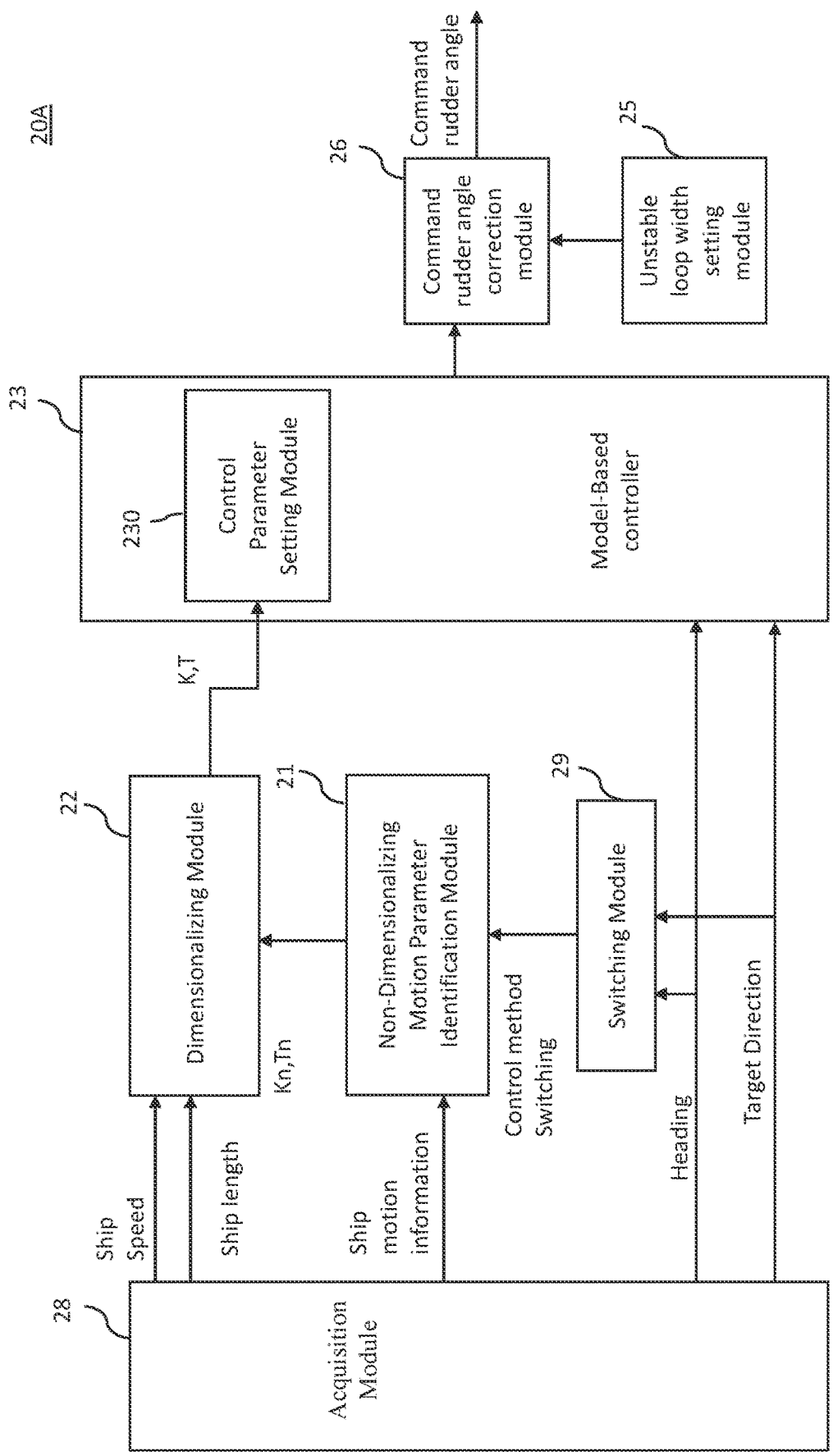
FIG. 6 is a functional block diagram illustrating the configuration of the processor module according to the second embodiment of the present disclosure.

An automatic steering device, an automatic steering system, an automatic steering method, and an automatic steering program according to the second embodiment of the present disclosure will be described with reference to the figures. FIG. 6 is a functional block diagram showing the configuration of a processor module according to the second embodiment of the present disclosure.

The automatic steering system according to the second embodiment differs from the automatic steering system 10 according to the first embodiment in that it is equipped with a processor module 20 A. The other configuration of the automatic steering system according to the second embodiment is the same as that of the automatic steering system according to the first embodiment, and a description of similar modules is omitted. In addition, the processor module 20A according to the second embodiment differs from the processor module 20 according to the first embodiment in that the command rudder angle is corrected as required. The other configuration of the processor module 20A is the same as that of the processor module 20, and a description of the same part is omitted.

The processor module 20A includes an unstable loop width setting module 25 and a command rudder angle correction module 26.

The unstable loop width setting module 25 sets an unstable loop width in rudder angle control of the ship. The unstable loop width setting module 25 outputs the set unstable loop width to the command rudder angle correction module 26.

Figure 7:
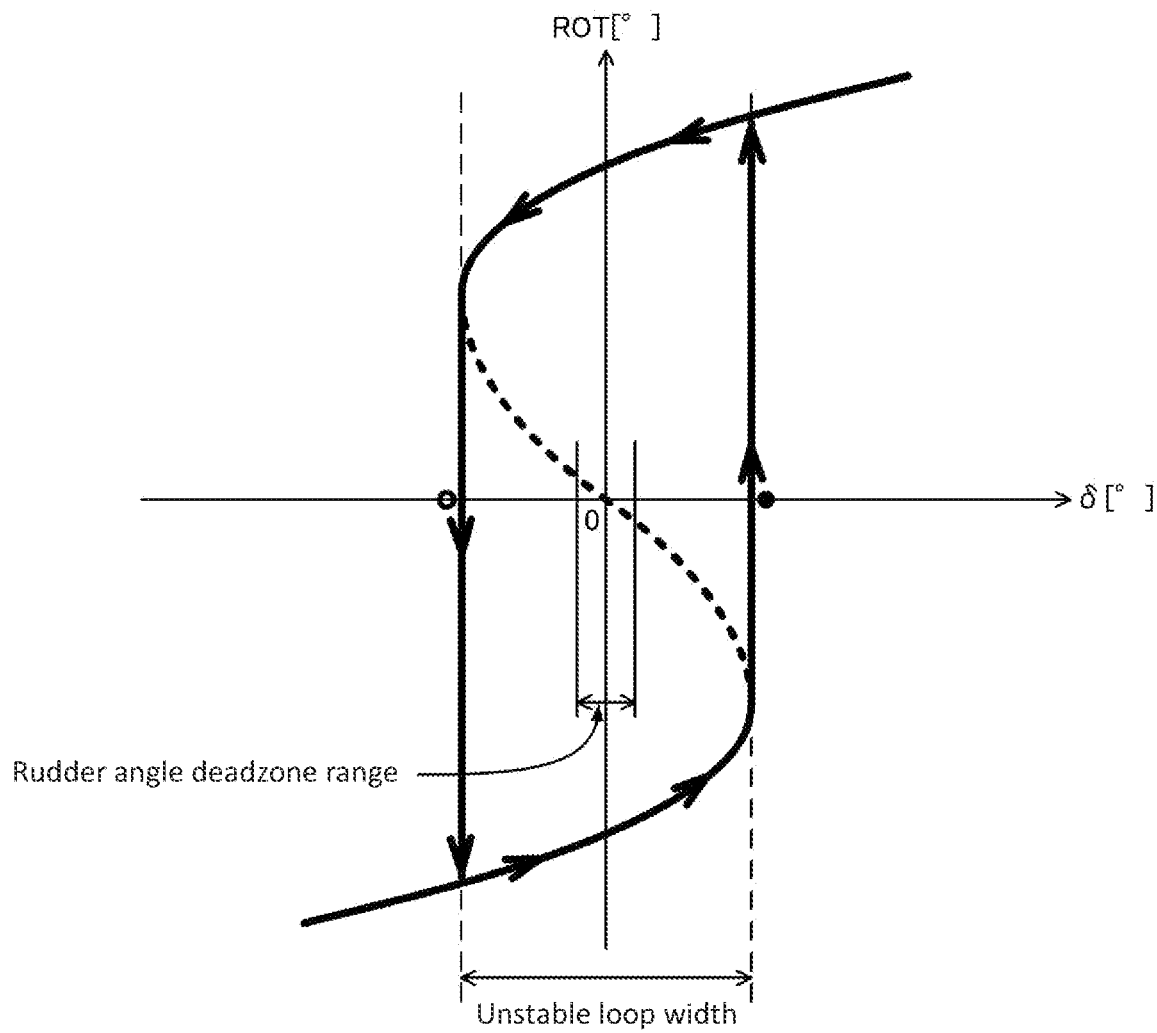
FIG. 7 is a diagram illustrating a concept of the unstable loop width.

The unstable loop width is set by the following concept. FIG. 7 illustrates the concept of the unstable loop width.

When controlling the ship with an unstable course, the heading becomes oscillatory. This phenomenon is caused by the property that when the ship with an unstable course begins to turn in one direction, it continues to turn even if it makes some rudder to stop the turning (=the turning speed has hysteresis). This hysteresis has the property shown by the curve in FIG. 7.

This hysteresis loop is an unstable loop, and the width of this loop in the direction of a steering angle (delta) is the unstable loop width.

Figure 8:
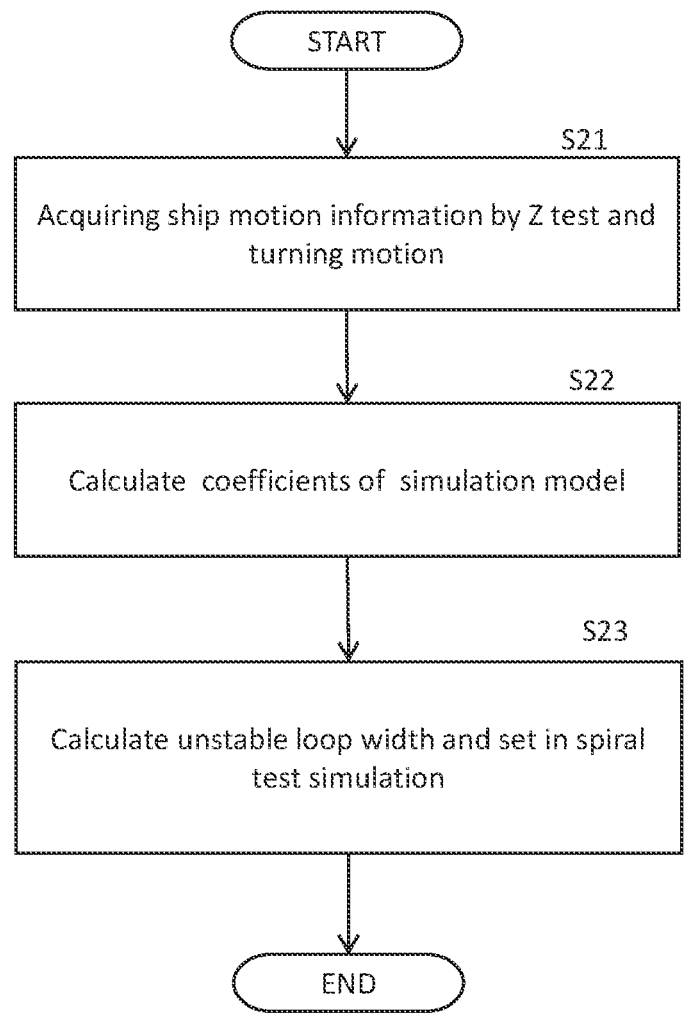
FIG. 8 is a flow chart illustrating an example of how the unstable loop width is calculated.

The unstable loop width can be calculated, for example, by the processing method shown in FIG. 8. FIG. 8 is a flowchart illustrating an example of the method for calculating the unstable loop width.

First, the motion information of the ship is acquired by the Z test and the turning motion (S21). Here, the motion information of the ship includes, at a minimum, the rudder angle, the heading, and the position of the ship. Note that the motion information of the ship may include the ship speed.

The acquired motion information of the ship is then used to calculate a coefficients of the simulation model (S22). For example, more specifically, the differential coefficients of the MMG model are calculated using SQP, CMA-ES, etc. In addition, some or all of the differential coefficients may be calculated from the main items of the ship specifications using a specific model, etc. In this case, acquisition of the ship motion information can be omitted.

Next, the unstable loop width is calculated and set in a spiral test simulation (S23). It should be noted that a reverse spiral test simulation may be used, and both the spiral test simulation and a reverse spiral simulation may be used.

If the command rudder angle estimated by the model-based controller 23 is not within the rudder angle range of the unstable loop width, the command rudder angle correction module 26 outputs the command rudder angle as it is.

If the command rudder angle estimated by the model-based controller 23 is within the rudder angle range of the unstable loop width, the command rudder angle correction module 26 corrects the command rudder angle and outputs it. More specifically, if the command rudder angle estimated by the model-based controller 23 is within the rudder angle range of the unstable loop width, the command rudder angle correction module 26 corrects the command rudder angle to a specific value outside the rudder angle range of the unstable loop width (see black circle or white circle in FIG. 7) and outputs it. For example, if the command rudder angle is on the '+' side within the rudder angle range of the unstable loop width, the command rudder angle is corrected on the '+' side of the rudder angle range of the unstable loop width to a specific value outside the rudder angle range of the unstable loop width (see black circle in FIG. 7). On the other hand, if the command rudder angle is on the '−' side within the rudder angle range of the unstable loop width, the command rudder angle is corrected on the '−' side of the rudder angle range of the unstable loop width to a specific value outside the rudder angle range of the unstable loop width (see white circle in FIG. 7). It is desirable that these specific values are close to the boundary of the command rudder angle range determined by the unstable loop width, but they can be set appropriately in consideration of the control error of the rudder.

By performing such control, the processor module 20A can output a more appropriate command rudder angle for automatic steering.

Furthermore, the command rudder angle correction module 26 sets the command rudder angle to 0 degrees when the command rudder angle is within an angle range narrower than the rudder angle blind zone based on the rudder angle blind zone. For example, specifically, the command rudder angle correction module 26 sets the command rudder angle to 0 degrees when the command rudder angle enters the angle between (boundary value on the '−' side of the rudder angle blind zone)/2 and (boundary value on the '+' side of the rudder angle blind zone)/2. This 0 degrees corresponds to a "preset predetermined value" related to the rudder angle blind zone of the present disclosure. Note that the command rudder angle correction module 26 can also adopt a method of not outputting the command rudder angle when the command rudder angle enters the angle between (boundary value on the '−' side of the rudder angle blind zone)/2 and (boundary value on the '+' side of the rudder angle blind zone)/2.

The rudder angle blind zone is defined by the following concept. To prevent hunting of the rudder, the rudder does not actually turn unless the difference between the command rudder angle and the actual rudder angle exceeds a certain value. This constant value is the rudder angle blind zone. This can be set automatically or manually.

By performing such control, the processor module 20A can set an appropriate command rudder angle according to the actual movement of the rudder.

Figure 9:
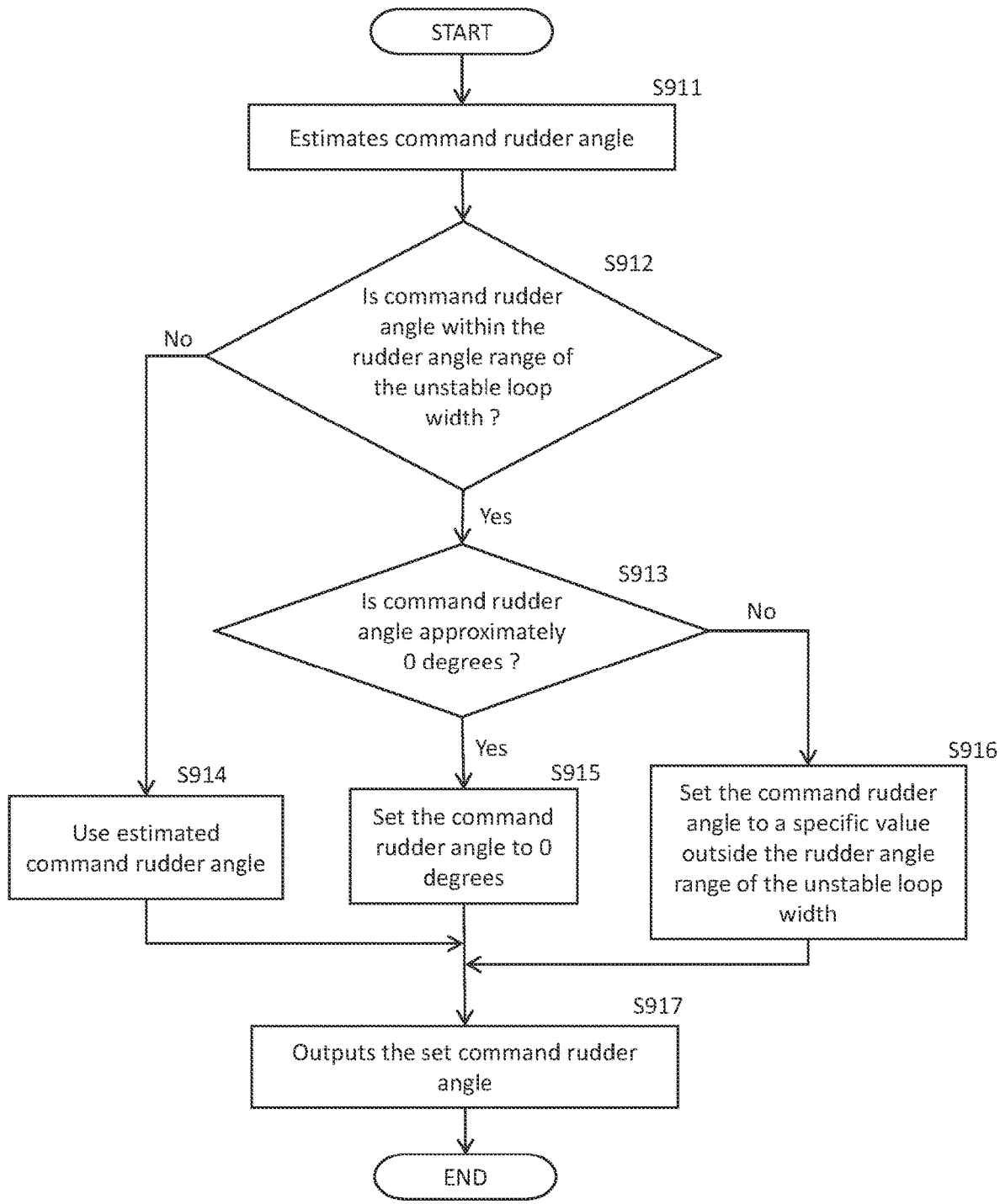
FIG. 9 is a flow chart illustrating the flow of schematic processing of command rudder angle correction performed in the processor module according to the second embodiment of the present disclosure.

The above processing is realized, for example, by processing of the flowchart shown in FIG. 9. FIG. 9 is a flow chart illustrating the flow of the schematic processing of command rudder angle correction executed in the processor module according to the second embodiment of the present disclosure.

The processor module 20A estimates the command rudder angle using the method described above (S911). If the command rudder angle is not within the rudder angle range of the unstable loop width (S912: NO), the processor module 20A uses (sets as is) the estimated command rudder angle (S914).

If the command rudder angle is within the rudder angle range of the unstable loop width (S912: YES) and the command rudder angle is not approximately 0 degrees (S913: NO), the processor module 20A sets (corrects) the command rudder angle to a specific value outside the rudder angle range of the unstable loop width (S916). It is agreed that the command rudder angle is approximately 0 degrees within the rudder angle range set by a rudder angle deadzone.

If the command rudder angle is within the rudder angle range of the unstable loop width (S912: YES) and the command rudder angle is approximately 0 degrees (S913: YES), the processor module 20A sets the command rudder angle to 0 degrees (S915).

The processor module 20A outputs the set command rudder angle to the rudder 90 (S917). This process of correcting the command rudder angle as necessary is executed until the rudder angle control is completed, as is the process of estimating the command rudder angle described above.

This correction of the command rudder angle may be performed together with the setting of the control parameters of the model-based controller 23 described above, or it may be performed for other methods of estimating the command rudder angle.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An automatic steering system comprising:
   an automatic steering device comprising:
   processing circuitry configured to:
      acquire a ship length and motion information including a ship speed;
      identify a non-dimensionalizing motion parameter based on the ship length and the motion information;

generate a dimensionalizing motion parameter by dimensionalizing the non-dimensionalizing motion parameter based on the ship speed; and
set a control parameter of a model-based controller based on the dimensionalizing motion parameter; and
a rudder configured to control a rudder angle based on a command rudder angle generated by the automatic steering device.

2. The automatic steering system according to claim 1, wherein the processing circuitry is further configured to:
generate the dimensionalizing motion parameter based on the ship speed when the ship speed changes by more than a preset threshold value after generating the dimensionalizing motion parameter; and
update the control parameter based on the dimensionalizing motion parameter after the change in the ship speed.

3. The automatic steering system of claim 2, wherein the processing circuitry is further configured to:
generate the dimensionalizing motion parameter when a predetermined time elapses from a time when the dimensionalizing motion parameter is generated; and
update the control parameter based on the dimensionalizing motion parameter after the predetermined time elapses.

4. The automatic steering system according to claim 3, wherein the processing circuitry is further configured to:
acquire a target direction of the ship and a heading of the ship,
switch the control mode of automatic navigation based on a deviation between the target direction and the heading, and
identify the non-dimensionalizing motion parameter based on the motion information of the ship acquired in the control mode before the switching when the control mode is switched by the processing circuitry.

5. The automatic steering system according to claim 4, wherein the processing circuitry is further configured to:
acquire the target direction of the ship and the heading of the ship, and
generate a command rudder angle based on the control parameter, taking the target direction and the heading as inputs.

6. The automatic steering system according to claim 5, wherein the processing circuitry is further configured to:
set an unstable loop width of the ship based on a kinetic model of a body of the ship identified by using the motion information of the ship, including a command rudder angle, a heading, and a ship position.

7. The automatic steering system according to claim 6, wherein the processing circuitry is further configured to:
set the command rudder angle to a value outside a range of the unstable loop width if the command rudder angle generated by the model-based controller is within the range of the unstable loop width.

8. The automatic steering system according to claim 7, wherein the processing circuitry is further configured to:
refrain from outputting the command rudder angle or set the command rudder angle to a predetermined value when the command rudder angle generated by the model-based controller is within a rudder angle deadzone.

9. The automatic steering system of claim 1, wherein the processing circuitry is further configured to:
generate the dimensionalizing motion parameter when a predetermined time elapses from a time when the dimensionalizing motion parameter is generated; and
update the control parameter based on the dimensionalizing motion parameter after the predetermined time elapses.

10. The automatic steering system according to claim 1, wherein the processing circuitry is further configured to:
acquire a target direction of the ship and a heading of the ship,
switch the control mode of automatic navigation based on a deviation between the target direction and the heading, and
identify the non-dimensionalizing motion parameter based on the motion information of the ship acquired in the control mode before the switching when the control mode is switched by the processing circuitry.

11. The automatic steering system according to claim 1, wherein the processing circuitry is further configured to:
acquire the target direction of the ship and the heading of the ship, and
generate a command rudder angle based on the control parameter, taking the target direction and the heading as inputs.

12. The automatic steering system according to claim 1, wherein the processing circuitry is further configured to:
set an unstable loop width of the ship based on a kinetic model of a body of the ship identified by using the motion information of the ship, including a command rudder angle, a heading, and a ship position.

13. The automatic steering system according to claim 12, wherein the processing circuitry is further configured to:
set the command rudder angle to a value outside a range of the unstable loop width if the command rudder angle generated by the model-based controller is within the range of the unstable loop width.

14. The automatic steering system according to claim 13, wherein the processing circuitry is further configured to:
refrain from outputting the command rudder angle or set the command rudder angle to a predetermined value when the command rudder angle generated by the model-based controller is within a rudder angle deadzone.

15. An automatic steering method, comprising:
operating an automatic steering device to:
acquire a ship length and motion information including a ship speed;
identify a non-dimensionalizing motion parameter based on the ship length and the motion information;
generate a dimensionalizing motion parameter by dimensionalizing the non-dimensionalizing motion parameter based on the ship speed; and
set a control parameter of a model-based controller based on the dimensionalizing motion parameter; and
controlling a rudder angle based on a command rudder angle generated by the automatic steering device.

16. A non-transitory computer-readable storage medium storing processor-executable instructions that, when executed, cause one or more processors to perform the method of claim 15.

* * * * *